US006563590B2

(12) United States Patent
Chowdhury et al.

(10) Patent No.: US 6,563,590 B2
(45) Date of Patent: May 13, 2003

(54) SYSTEM AND METHOD FOR MEASUREMENT OF THE STATE OF POLARIZATION OVER WAVELENGTH

(75) Inventors: Dipakbin Q. Chowdhury, Corning, NY (US); Ioannis Roudas, North Brunswick, NJ (US); Richard S. Vodhanel, Red Bank, NJ (US)

(73) Assignee: Corning Incorporated, Corning, NY (US)

( * ) Notice: Subject to any disclaimer, the term of this patent is extended or adjusted under 35 U.S.C. 154(b) by 124 days.

(21) Appl. No.: 09/785,641

(22) Filed: Feb. 16, 2001

(65) Prior Publication Data

US 2002/0140943 A1 Oct. 3, 2002

(51) Int. Cl.$^7$ ................................................. G01B 9/02
(52) U.S. Cl. ........................................ 356/484; 356/477
(58) Field of Search ................................ 356/484, 477, 356/349, 346, 351, 5, 28, 451; 372/32, 20

(56) References Cited

U.S. PATENT DOCUMENTS

| | | | | |
|---|---|---|---|---|
| 4,817,101 A | * | 3/1989 | Wyeth et al. | 372/32 |
| 4,922,481 A | * | 5/1990 | Hicks | 370/4 |
| 4,940,331 A | * | 7/1990 | Wyeth et al. | 356/349 |
| 5,377,219 A | * | 12/1994 | Geiger | 372/97 |
| 5,687,261 A | * | 11/1997 | Logan | 385/24 |

OTHER PUBLICATIONS

Exhibit A is an article entitled "Phenomenologic Approach to Polarisation Dispersion in Long Single–Mode Fibres", Electronic Letters, 1986, vol. 22, p.1029–1030.

Exhibit B is an article entitled "Polarization–dependent pulse compression and broadening due to polarization dispersion in dispersion–shifted fiber", Optics Letters, Feb. 1988, vol. 13, No. 2, p. 155–157.

Exhibit C is an article entitled "Polarisation mode dispersion compensation at 20 Gbit/s with fibre–based distributed equaliser", Electronics Letters, 10$^{th}$ Dec. 1998, vol. 34, No. 25.

Exhibit D is an article entitled "Polarization Control for Coherent Fiber–Optic Systems Using Nematic liquid Crystals", Journal of Lightwave Technology, Mar. 1990, vol. 8, No. 3, p. 459–465.

Exhibit E is an article entitled "Endless Polarization Control Systems for Coherent Optics", Journal of Lightwave Technology, Jul. 1988, vol. 6, No. 7, p. 1199–1208.

Exhibit F is an article entitled "Automated Measurement of Polarization Mode Dispersion Using Jones Matrix Eigenanalysis", IEEE Photonics Technology Letters, Sep. 1992, vol. 4, No. 9, p. 1066–1069.

\* cited by examiner

*Primary Examiner*—Constantine Hannaher
*Assistant Examiner*—Otilia Gabor

(57) ABSTRACT

A system for measuring the state of polarization (SOP) of an optical signal. The system includes a tunable local oscillator providing a local optical signal. A polarization transformer is operatively connected to the local oscillator and transforms the local optical signal to a selected one of a plurality of polarizations. A coupler combines an optical signal from the polarization transformer with an input optical signal from an optical system. A heterodyne detector is operatively connected to the coupler to detect the beat frequency of the signal from the coupler and provide an output signal that can be utilized to determine the state of polarization of an input optical signal.

26 Claims, 1 Drawing Sheet

SYSTEM AND METHOD FOR MEASUREMENT OF THE STATE OF POLARIZATION OVER WAVELENGTH

CROSS-REFERENCE TO RELATED APPLICATION

This application is to be filed simultaneously with U.S. Patent Application under attorney docket number SP01-008 entitled "Adaptive Feedback Control Techniques for Polarization Mode Dispersion or Chromatic Dispersion Compensator" inventors being D. Sobiski and M. Whiting and hereto this same day to be filed simultaneously as U.S. Patent Application under, attorney docket number SP00-055 entitled "Electric Detector for Adaptive Control of Chromatic Dispersion in Optical Systems" name inventors being C. Henning and D. Sobiski and U.S Patent Application under attorney docket number SP01-017 entitled "System and Method for Measurement of PMD over Wavelength" inventor James A. Smith, Eric Green and Donald Sobiski which are all hereby incorporated by reference.

BACKGROUND OF THE INVENTION

The invention relates to glass that is transmissive at wavelengths below 193 nm, in particular, a photomask silicon oxyfluoride glass suitable for use in the Vacuum Ultraviolet (VUV) 157 nm wavelength region.

FIELD OF THE INVENTION

The present invention relates to a device and method for measuring state of polarization (SOP), and more particularly to a device and method for rapidly measuring SOP at different wavelengths.

TECHNICAL BACKGROUND

Polarization mode dispersion (PMD) in single-mode optical fibers is a recognized source of bit errors in high-speed optical communication systems. PMD may cause optical pulse broadening, or pulse deformation in general. As such, PMD may limit the bit rate that can be achieved with a given optical communication system that does not compensate for PMD. As pulses broaden, the individual bits eventually are no longer distinguishable and the communication system ceases to properly function.

In the theoretical field, Poole and Wagner introduced a model for polarization dispersion in single-mode fibers based on so-called principle states of polarization (PSPs) (see Poole and Wagner, "Phenomenological Approach to Polarization Dispersion in Long Single-mode Fibres, *Electronics Letters*, volume 22, pp. 1029–1030, 1986"). In this approach, the broadening induced by first order PMD is caused by the propagation time difference, known as differential group delay (DGD), between the input pulse projections along the two PSPs. Second order PMD also results in pulse defamation, and is due to the frequency dependence of the PSPs and the DGD (see C. D. Poole and C. R Giles, "Polarisation-dependent Pulse Compression and Broadening Due to Polarisation Mode Dispersion in Dispersion-shifted Fibres, *Optics Letters*, volume 13, pp. 155–157, 1988"). Second order PMD induced pulse broadening may be a significant obstacle to using high bit-rates of, for example, 40 Gbit/s and higher.

One of the key components of an effective PMD compensator is the detection mechanism for determining the impairment, the compensator is to mitigate. To date, an effective device and method for detecting second order DGD for an optical communication system is not generally available.

SUMMARY OF THE INVENTION

One aspect of the present invention is a system for measuring the state of polarization of an optical signal. The system includes a local oscillator providing a local optical signal. The local oscillator is tunable such that the frequency of the local optical signal can be selectively varied. A polarization transformer is operatively connected to the local oscillator to transform the local optical signal to a selected one of a plurality of polarizations. A coupler is operatively connected to the polarization transformer. The coupler is adapted to combine an optical signal from the polarization transformer with an input optical signal from an optical system. A heterodyne receiver is operatively connected to the coupler. The heterodyne receiver is configured to detect the beat frequency of the signal from the coupler and provide an output signal that can be utilized to determine the state of polarization of an input optical signal.

Another aspect of the present invention is a method of measuring the state of polarization of an optical signal in an optical line. The method includes providing a local optical signal at a first selected frequency. The local optical signal is transformed to a first selected polarization. The local optical signal having the first selected polarization is combined with an input optical signal from the optical line to form a first combined signal having a first amplitude at the beat frequency. The amplitude at the beat frequency of the combined signal is then detected, and the local optical signal is transformed to a second selected polarization. The local optical signal having the second selected polarization is combined with an input optical signal from the optical line to form a second combined signal having a second amplitude at the beat frequency. The amplitude at the beat frequency of the second combined signal is then detected, and the local optical signal is transformed to a third selected polarization. The local optical signal having the third selected polarization is combined with an input optical signal from the optical line to form a third combined signal having a third amplitude at the beat frequency. The third amplitude at the beat frequency of the third combined signal is detected. The state of polarization for the first selected frequency of the local optical signal between the input pulse projections is calculated based, at least in part, upon the third amplitude at the beat frequency. The frequency of the local optical signal is changed to a selected second frequency that is different than the first selected frequency. The local optical signal is transformed to first, second, and third polarizations, and the state of polarization is calculated for the second selected frequency.

Yet another aspect of the present invention is a method of measuring the state of polarization of an optical signal and an optical line. The method includes providing a local optical signal having a frequency that can be set at a selected one of a plurality of frequencies. The local optical signal is combined with an input optical signal from the optical line to produce a combined signal having a beat frequency. The frequency and polarization of the local optical signal are varied. The differential group delay of the optical signal in the optical line at a plurality of frequencies and polarizations of the local optical signal is calculated based, at least in part, upon the resulting amplitude at the beat frequencies of the combined signal.

Yet another aspect of the present invention is a device for measuring the state of polarization of a system optical signal. The device includes a local light source generating a general local signal. The local light source is configured to selectively vary the frequency and polarization of the local optical signal. The device includes a coupler that is adapted to combine the local optical signal with a system optical signal to produce a combined signal having a beat frequency. The device further includes a detector configured to provide a signal corresponding to the beat frequency to permit determination of the differential group delay across the bandwidth of the system optical signal.

Yet another aspect of the present invention is an optical communication system including an optical transmitter, an optical receiver, and a fiber optic line extending between an operatively interconnecting optical receiver to the optical transmitter to permit transmission of a system optical signal therebetween. The optical communication system also includes a state of polarization detecting device having a local light source providing a local optical signal. The local light source is configured to selectively vary the frequency and polarization of the local optical signal. The polarization mode dispersion detecting device also includes a coupler operatively interconnecting the local light source to the fiber optic line to produce a combined signal having a beat frequency. A detector is configured to provide a signal corresponding to the beat frequency to permit determination of the state of polarization across the bandwidth of the system optical signal.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
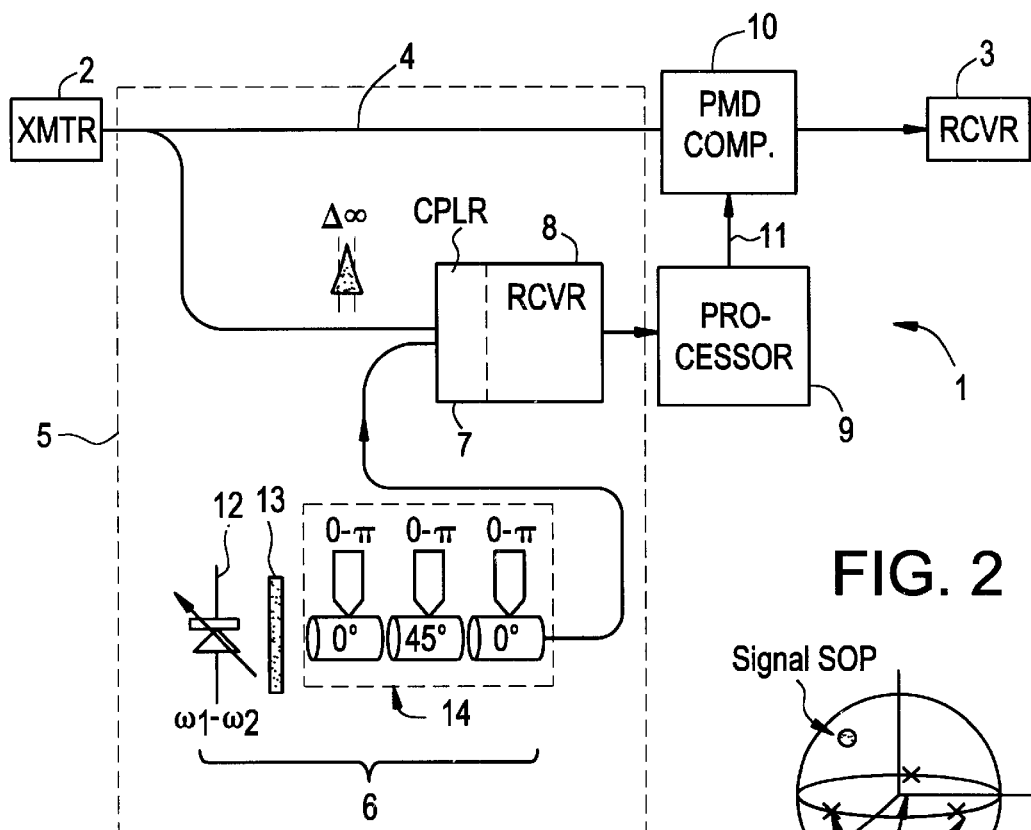
FIG. 1 is a diagram partly in block and schematic form of an optical communication system including a device for measuring the state of polarization in the system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIG. 1, there is shown an optical communication system 1 which, includes an optical transmitter 2, an optical receiver 3, and a fiber optic line 4 extending between and operatively interconnecting the optical receiver 3 to the optical transmitter 2 to permit transmission of optical signals therebetween. The optical communication system 1 also includes a state of polarization detecting device 5 having a local light source 6 for providing a local optical signal which can be selectively varied in frequency and polarization. A coupler 7 interconnects the local light source 6 to the fiber optic line 4 to produce a combined signal having a beat frequency. A detector 8 such as heterodyne receiver provides a signal corresponding to the beat frequency between the local light source and the optical signal of the optical communication system and is applied to a processor 9 to determine the differential group delay across the bandwidth of the system optical signal. The processor 9 then generates a control signal 11 to a PMD compensator 10 that compensates for the PMD.

In a preferred embodiment, local light source 6 includes a tunable laser 12 acting as a Local Oscillator (LO) providing a local optical signal at a selected frequency. The laser may be either tunable continuously or discretely across a frequency range that is at least as great as the bandwidth ($\Delta\omega$) of the optical signal of the system. In a multi-channel system, this frequency range may cover the whole communication window. The signal from the local oscillator 12 is passed through a polarizer 13, and through a polarization transformer 14 to thereby transform the local optical signal to a preselected optical state of polarization. The polarization transformer 14 utilizes squeezed polarization maintaining fiber. Polarization transformer 14 is described in detail in pending U.S. patent application Ser. No. 09/589,423, entitled ALL FIBER POLARIZATION DISPERSION COMPENSATOR, filed on Jun. 7, 2000, the entire contents of which is hereby incorporated herein by reference. Other polarization transformers could be utilized to provide the desired polarization states for input into the detector 8.

Figure 2:
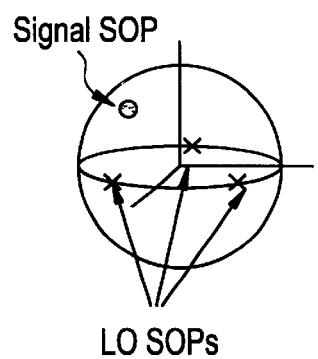
FIG. 2 is a diagram of a Poincaré sphere illustrating the local oscillator (LO) state of polarization (SOP) as shown by the Xs for a given wavelength $\lambda$.

During operation, the laser 12 is tuned to a desired frequency, and the polarization transformer is utilized to scan the local optical signal into three states of polarization as shown by the Xs (FIG. 2) for a given wavelength ($\lambda$). As described in more detail below, the resulting beat signal is detected by the detector 8, and utilized to compute the [Jones matrix to obtain the] state of polarization (SOP). The DGD can be obtained from the $\lambda$ dependence of the state of polarization. In order to spectrally resolve the SOP over the signal bandwidth $\Delta\omega$, the local oscillator is scanned so that $\omega_2 - \omega_1$ is $\geq \Delta\omega$. Thus, by sweeping the local oscillator over the entire bandwidth of the optical system, the SOP information for the entire system bandwidth as a function of $\lambda$ can be determined.

Figure 3:
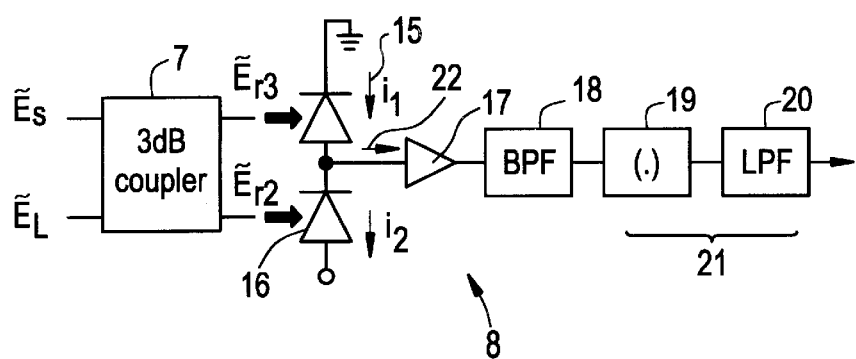
FIG. 3 is an electro-optical block diagram of the heterodyne receiver of FIG. 1.

Although various detection systems could be utilized to determine the beat frequency, the detector 8 of FIG. 1 is a preferably a heterodyne detector as illustrated in FIG. 3. The heterodyne detector 8 includes a 3 dB coupler 7, a first photodiode 15, and a balanced second photodiode 16. The total current 22 from the first and second diodes 15 and 16 applies a signal to an amplifier 17, a bandpass filter (BPF) 18, a square-law device 19, and a lowpass filter (LPF) 20. The square-law device 19 and lowpass filter 20 together form a square-law detector 21. The following notation is utilized in FIG. 3:

Wherein:

=Complex envelope $E_S$=Optical signal electric field $E_L$=Optical local oscillator electric field $E_{r1}$=Electric field detected by photodiode 1

$E_{r2}$=Electric field detected by photodiode 2

$i_1$=Photocurrent at photodiode 1

$i_2$=Photocurrent at photodiode 2

$i_{tot}$=Total photocurrent

BPF=Bandpass filter $(.)^2$=Square-law device

LPF=Lowpass filter

The electrical field of the optical signal is given by:

$$E(t) = Re\{\tilde{E}(t)e^{i\omega_0 t}\}$$

Wherein:

$\tilde{E}(t)$=Complex envelope $\omega_0 = 2\pi f_0$=Reference carrier angular frequency The complex envelopes are defined by the following equations:

$$\tilde{E}_s(t) = A_s d(t) e^{i(\omega_s t + \phi_s)} (p_s \hat{x} + q_s e^{i\delta_s} \hat{y})$$

$$\tilde{E}_L(t) = [A_L + A_n(t)] e^{i(\omega_L t + \phi_L)} (p_L \hat{x} + q_L e^{i\delta_{di\,L}} \hat{y})$$

$A_s, A_L$=Amplitude of the electric fields of optical signal and local oscillator $\omega_s, \omega_L$=Angular carrier frequency of the optical signal and local oscillator $\phi_s, \phi_L$=Phase noise of the optical signal and local oscillator $p_s, p_L$=$\hat{y}$ components of polarization $q_s, q_L$=$\hat{y}$ components of polarization $\delta_s, \delta_L$=phase difference between $\hat{x}, \hat{y}$ components of polarization d(t)=Modulating signal $A_n(t)$=Amplitude noise related to laser RIN The electric fields detected by the photodiodes 15, 16 are as follows:

$$\tilde{E}_{r1}(t) = \frac{1}{\sqrt{2}}[\tilde{E}_s(t) + \tilde{E}_L(t)]$$

$$\tilde{E}_{r2}(t) = \frac{1}{\sqrt{2}}[\tilde{E}_s(t) - \tilde{E}_L(t)]$$

The photocurrent at the upper and lower branches of the coupler 7 is as follows:

$$i_{1,2} = \frac{R_{1,2}}{2}(|E_{x_{1,2}}|^2 + |E_{y_{1,2}}|^2)$$

Wherein:

$R_{1,2}$=Responsivity of the photodiodes at the two branches $E_{x_{1,2},y_{1,2}}$=$\hat{x},\hat{y}$ components of the incident electric field at the two branches The total photocurrent is given by the following equation:

$$i_{tot} = RA_s d(t) A_L \{p_s p_L \cos[\omega_{IF} t + \Delta\phi] + q_s q_L \cos[\omega_{IF} t + \Delta\phi + \Delta]\} + n(t) + O[A_n^2(t)]$$

Wherein:

$R = R_1 = R_2$ $\omega_{IF} = \omega_s - \omega_L$=Intermediate angular frequency $\Delta\phi = \phi_s - \phi_L$=Total phase noise $\Delta = \delta_s - \delta_L$=Polarization phase difference n(t)=shot and thermal noise In the absence of noise, a narrow bandpass filter ideally selects only one frequency component of the IF spectrum:

$$i_{tot} \cong a\{p_s p_L \cos(\omega_c t) + q_s q_L \cos(\omega_c t + \Delta)\}$$

Wherein:

a=Amplitude of frequency component at frequency $f_c$ $\omega_c$=Center angular frequency of the BPF=$2\pi f_c$ The square-law detector is described as follows:

$$\langle i_{tot}^2 \rangle = \frac{a^2}{2}\{p_s^2 p_L^2 + q_s^2 q_L^2 + 2 p_s p_L q_s q_L \cos\Delta\},$$

< >=Time-average over the LPF intergration time

The stokes parameters can be evaluated by setting the local oscillator at 4 distinct states of polarization. These states of polarization, for example, linear 0, linear 90, linear 45 degrees, and circular left polarizations:

$$\langle i_{tot}^2 \rangle|_{LO=0°} + \langle i_{tot}^2 \rangle|_{LO=90°} = \frac{a^2}{2}(p_s^2 + q_s^2) = S_0$$

$$\langle i_{tot}^2 \rangle|_{LO=0°} - \langle i_{tot}^2 \rangle|_{LO=90°} = \frac{a^2}{2}(p_s^2 - q_s^2) = S_1$$

Where $S_i$, i=0, . . . ,3 are the Stokes parameters.

The normalized Stokes parameters are calculated dividing with:

$$S_0 = \sqrt{S_1^2 + S_2^2 + S_3^2}$$

As discussed above, the output from the detector 8 is utilized by the processor 9 to generate a control signal 11 to the PMD detector 10. The processor 9 is programmed to utilize the output voltages from the detector 8 to calculate the stokes vector for each wavelength as the local oscillator is scanned across the bandwidth of the system optical signal utilizing known mathematical techniques.

The device, method and system of the present invention can be utilized to determine SOP as a function of wavelength, such that higher order DGD may be compensated. The state of polarization (SOP) is determined for the entire bandwidth of the signal, such that higher order PMD may be compensated.

It will become apparent to those skilled in the art that various modifications to the preferred embodiment of the invention as described herein can be made without departing from the spirit or scope of the invention as defined by the appended claims.

The invention claimed is:

1. A system for measuring the state of polarization of an optical signal in an optical communications system, the system comprising:

a tunable local oscillator for providing a local polarized optical signal whose frequency can be selectively varied;

a polarizer operatively connected to the local oscillator for providing a polarized local optical signal;

a polarization transformer operatively connected to the polarizer to transform the local polarized optical signal to a selected one of a plurality of polarizations;

a coupler operatively connected to the polarization transformer, for combining an optical signal from the polarization transformer with an input optical signal from the optical communications system;

a heterodyne detector operatively connected to the coupler, the heterodyne detector configured to detect a beat frequency of the signal from the coupler and provide an output signal that can be utilized to determine the state of polarization of an input optical signal.

2. The system of claim 1 wherein the local oscillator includes a laser having a frequency range at least as great as the bandwidth of the optical signal.

3. The system of claim 2 wherein the laser is continuously tunable over the frequency range.

4. The system of claim 1 further comprising:

a processor operatively connected to the heterodyne receiver, the processor programmed to determine differential group delay as a function of wavelength.

5. The system of claim 1 wherein the polarization transformer includes polarization maintaining fibers that are squeezed to transform the polarization state of the local optical signal.

6. A method for measuring the state of polarization of an optical signal in an optical line, the method comprising the steps of:

providing a local optical signal at a first selected frequency;
transforming the local optical signal to a first selected polarization;
combining the local optical signal having the first selected polarization with an input optical signal from the optical line to form a first combined signal having a first amplitude at the beat frequency;
detecting the amplitude at a beat frequency of the first combined signal;
transforming the local optical signal to a second selected polarization;
combining the local optical signal having the second selected polarization with an input optical signal from the optical line to form a second combined signal having a second amplitude at the beat frequency;
detecting the amplitude at the beat frequency of the second combined signal;
transforming the local optical signal to a third selected polarization;
combining the local optical signal having the third selected polarization with an input optical signal from the optical line to form a third combined signal having a third amplitude at the beat frequency;
detecting the third beat frequency of the third combined signal;
calculating a differential group delay for the first selected frequency of the local optical signal between two or more input pulse projections based at least in part upon the beat frequency;
changing the frequency of the local optical signal to a selected second frequency that is different than the first selected frequency;
transforming the local optical signal to first, second, and third polarizations; and calculating the state of polarization for the second selected frequency.

7. The method of claim 6 wherein the optical signal in the optical line defines a bandwidth bounded by upper and lower frequencies, and the state of polarization is calculated for a plurality of frequencies across the bandwidth by varying the frequency of the local optical signal and transforming the local optical signal to a plurality of polarizations.

8. The method of claim 7 wherein the local optical signal is set at linear zero degrees, linear ninety degrees, linear forty five degrees, and circular left polarizations each frequency setting of the local oscillator.

9. The method of claim 6 wherein the local optical signal is routed through polarization maintaining fiber, and transformed by squeezing the polarization maintaining fibers with a piezoelectric device.

10. A method for measuring the state of polarization of an optical signal in an optical line, the method comprising:

providing a local optical signal having a frequency that can be set at a selected one of a plurality of frequencies;
combining the local optical signal with an input optical signal from the optical line to produce a combined signal having a beat frequency;
varying the frequency and polarization of the local optical signal;
calculating the state of polarization of the optical signal in the optical line at a plurality of frequencies and polarizations of the local optical signal based at least in part upon the resulting beat frequencies of the combined signal.

11. The method of claim 10 wherein the optical signal in the optical line defines a bandwidth having upper and lower bounds, and the frequency of the local optical signal is varied from a frequency about equal to the lower bound to a frequency about equal to the upper bound.

12. The method of claim 11 wherein the polarization of the local optical signal is set to at least three distinctly different polarization states for each frequency of the local optical signal.

13. The method of claim 12 wherein the beat frequency is an amplitude beat frequency of the combined signal and is utilized to calculate the state of polarization for each frequency of the local optical signal.

14. The method of claim 13 wherein the local optical signal is routed through polarization maintaining fiber that is squeezed to change the polarization of the local optical signal.

15. The method of claim 13 wherein the local optical signal state of polarization is set at four distinct positions on the Poincaré sphere so that the enclosed volume is maximized within the Poincaré sphere.

16. The method of claim 12 wherein said polarization of the local optical signal is set to at least four distinctly different polarization states for each frequency of the local optical signal.

17. A system for measuring the state of polarization of a system optical signal, comprising:

a tunable local light source for generating a local optical signal whose frequency and polarization can be selectively varied;
a coupler for combining the local optical signal with a system optical signal to produce a combined signal having a beat frequency; and
a detector configured to provide a signal corresponding to the beat frequency to permit determination of the state of polarization across the bandwidth of the system optical signal.

18. The system of claim 17 wherein the local light source includes a tunable laser and, a polarization transformer.

19. The system of claim 18 wherein the detector comprises a heterodyne detector.

20. The system of claim 19 wherein the polarization transformer includes polarization maintaining fibers that are squeezed to transform the polarization state of the local optical signal.

21. The system of claim 20 wherein the laser is continuously tunable over a frequency range at least as great as the bandwidth of the system optical signal.

22. An optical communications system comprising:
   an optical transmitter;
   an optical receiver;
   a fiber optic line extending between and operatively interconnecting the optical receiver to the optical transmitter to permit transmission of a system optical signal therebetween;
   a state of polarization determining device including:
      a tunable local light source for providing a local optical signal having a frequency and a polarization which can be selectively varied;
      a coupler operatively interconnecting the local light source to the fiber optic line to produce a combined signal having a beat frequency;
      a detector configured to provide a signal corresponding to the beat frequency to permit determination of a differential group delay across the bandwidth of the system optical signal; and
      a processor for calculating a state of polarization of the system optical signal.

23. The optical communications system of claim 22 wherein the tunable local light source is a laser having a frequency range at least as great as the bandwidth of the system optical signal.

24. The optical communications system of claim 22 wherein the processor is connected to the optical receiver and determines the differential group delay as a function of wavelength.

25. The optical communications system of claim 24 wherein the state of polarization determining device includes a plurality of polarization maintaining fibers that are squeezed to transform the state of polarization of the local optical signal.

26. The optical communications system of claim 25 wherein the laser is continuously tunable over a frequency range.

* * * * *